United States Patent [19]

Morita et al.

[11] Patent Number: 5,080,948
[45] Date of Patent: Jan. 14, 1992

[54] MAGNETIC RECORDING/REPRODUCING SYSTEM COMPRISING A GLASS SUBSTRATE THIN FILM MAGNETIC DISK AND A FLYING MAGNETIC HEAD WITH DEFINED SPACING AND SURFACE ROUGHNESS

[75] Inventors: Haruyuki Morita; Joichiro Ezaki; Yasufumi Uno, all of Nagano, Japan

[73] Assignee: TDK Corporation, Tokyo, Japan

[21] Appl. No.: 354,375

[22] Filed: May 19, 1989

[30] Foreign Application Priority Data

Apr. 28, 1989 [JP] Japan .................................. 1-110390

[51] Int. Cl.⁵ .............................................. G11B 23/00
[52] U.S. Cl. ...................................... 428/64; 428/694; 428/900; 428/141; 428/432; 360/122; 360/103; 360/135; 204/192.2
[58] Field of Search ................. 428/141, 64, 432, 433, 428/694, 900; 360/103, 135, 122; 204/192.2

[56] References Cited

U.S. PATENT DOCUMENTS

| | | | |
|---|---|---|---|
| 3,516,860 | 6/1970 | Simmons | 117/236 |
| 4,608,293 | 8/1986 | Wada et al. | 428/141 |
| 4,690,846 | 9/1987 | Wada et al. | 428/64 |
| 4,803,577 | 2/1988 | Ezaki et al. | 360/102 |
| 4,808,455 | 2/1989 | Wada et al. | 428/64 |
| 4,808,463 | 2/1989 | Yoshikatsu et al. | 428/215 |

Primary Examiner—Merrell C. Cashion, Jr.
Assistant Examiner—Stevan A. Resan
Attorney, Agent, or Firm—Oblon, Spivak, McClelland, Maier & Neustadt

[57] ABSTRACT

A magnetic recording medium comprising a glass substrate and a magnetic thin film thereon is provided for use in a magnetic recording/reproducing system having a flying magnetic head. Floating performance is improved when the glass substrate has a surface roughness Rmax of 10–80 Å and the magnetic thin film has a surface roughness Rmax of 50–150 Å. Recording and reproducing information on a magnetic disk is carried out by driving the magnetic disk while keeping a magnetic head floating relative to the disk at a spacing therebetween of up to 0.2 μm.

8 Claims, 2 Drawing Sheets

MAGNETIC RECORDING/REPRODUCING SYSTEM COMPRISING A GLASS SUBSTRATE THIN FILM MAGNETIC DISK AND A FLYING MAGNETIC HEAD WITH DEFINED SPACING AND SURFACE ROUGHNESS

This invention relates to a magnetic recording medium of the hard type having a magnetic thin film on a rigid substrate and a method for making the same. It also relates to a system for recording and reproducing information in such a magnetic recording medium using a flying magnetic head.

BACKGROUND OF THE INVENTION

Magnetic recording/reproducing equipment for computers or the like generally drives a magnetic disk of the hard type having a magnetic thin film on a rigid substrate relative to a flying magnetic head for magnetic recording/reproducing purposes.

The flying magnetic head has a slider which generates floating forces in a air bearing fashion. The flying magnetic head is generally classified into the composite type in which a core is integrated with the slider and the monolithic type in which a core also serves as the slider.

For maximum density recording, flying thin film magnetic heads have been used in practice. The flying thin film magnetic heads are formed by forming magnetic pole, gap, coil and other necessary layers on a nonmagnetic base by vapor phase deposition techniques or wet plating techniques. In these flying thin film heads, the base plays the role of a slider.

Most magnetic disks used in the past were of the coating type. To meet a demand for increasing the capacity of magnetic disks, magnetic disks of the thin film type now find increasing use. The thin film type magnetic disks have a magnetic thin film, also known as a continuous thin film, which is formed by vapor phase deposition techniques such as sputtering. They have excellent magnetic properties and increased recording density.

In the coating type magnetic disks, surface properties of a substrate do not significantly affect surface properties of the disk medium since the magnetic layer is as thick as 1 to 2 $\mu$m. In the thin film type magnetic disks, however, surface properties of a substrate do significantly affect surface properties of the disk medium since the magnetic layer is as thin as 0.5 $\mu$m or less. Thus the surface properties of the disk medium may be improved by using a substrate having a high precision surface. Then the magnetic head can assume a reduced floating distance above the disk, resulting in a reduced spacing loss, which in turn ensures an increased output and recording density.

Certain thin film type magnetic disks use modified substrates. One known modification is by forming an Ni-P plating layer of about 50 $\mu$m thick on an aluminum alloy substrate followed by polishing the plating surface. Also known are those substrates which are prepared by anodizing an aluminum alloy substrate on the surface to form a hard oxide layer of about 2 $\mu$m thick followed by polishing the anodized surface. These modified substrates have a surface roughness Rmax of about 0.15 $\mu$m.

Magnetic thin films are formed on such substrates. For example, a magnetic thin film consisting essentially of Co-Ni may be formed by sputtering Cr on the substrate, further sputtering a Co-Ni base alloy thereon to form a thin film of about 1,000 Å thick, and depositing a protective/lubricating coating of carbon or the like to a thickness of about 200 Å. The surface of the resulting medium reflects the substrate surface properties and has a surface roughness Rmax of about 0.15 $\mu$m.

Another typical magnetic thin film is one consisting essentially of iron oxide. A medium is prepared by sputtering an iron base target in an atmosphere of Ar plus $O_2$ to form a sputtered film predominantly comprising $\alpha\text{-}Fe_2O_3$ or $Fe_3O_4$ on the substrate to a thickness of about 2,000 Å. If the sputtered material is $\alpha\text{-}Fe_2O_3$, it is converted into $Fe_3O_4$ by heating to a temperature of about 300° C. in a reducing atmosphere. The next step is heating at a temperature of about 300° C. in an oxidizing atmosphere for oxidizing $Fe_3O_4$, forming a film predominantly comprising $\gamma\text{-}Fe_2O_3$. A protective/lubricating coating is deposited thereon to complete a medium. The resulting medium also has the surface which reflects the substrate surface properties, presenting a surface roughness Rmax of about 0.15 $\mu$m.

Now that the entire medium manufacturing process is briefly described, the starting substrate is described again in detail. The aluminum alloy substrate having an Ni-P plating layer polished suffers from complexity of substrate preparation because the aluminum alloy substrate must be surface activated prior to Ni-P plating. The surface activation and subsequent steps are a main cause for adding to the substrate cost since these steps occupy more than 50% of the cost of the final substrate.

Further, the Ni-P plating layer tends to crystallize and thus possess magnetism when heated at temperatures of higher than 150° C. The use of Ni-P plated aluminum alloy substrates is negated if the medium manufacturing process involves heating as in forming a magnetic thin film of iron oxide.

On the other hand, the anodized aluminum alloy substrates have the drawback that the anodized film tends to crack during heat treatment because stresses develop due to the differential thermal expansion between the aluminum alloy matrix and the anodized film. The heating temperature must be limited to below 300° C. in forming a magnetic thin film of iron oxide. The anodized film is of a porous structure having a plurality of conductive pores. When a magnetic thin film is formed on such an anodized substrate, magnetic defects often occur at the sites of conductive pores. Also, the surface roughness of the anodized film is not satisfactory as shown by Rmax of about 0.15 $\mu$m.

When the substrate has a relatively large surface roughness Rmax, the magnetic thin film formed thereon also has a correspondingly large surface roughness Rmax. If the spacing between the flying head and the disk in operation is reduced, there arises a possibility that the head can make contact with protuberances on the disk surface causing abrasion of the magnetic thin film or damages to the magnetic head.

The surface precision of a medium is a critical factor for allowing the magnetic head to float in a stable manner and for minimizing the floating distance between the head and the medium.

U.S. Pat. No. 3,516,860 discloses magnetic disks using glass substrates. The use of glass substrates is advantageous in that they remain intact upon heating in the magnetic thin film forming process. It is disclosed that the glass surface is preferably made as smooth as possible. However, no specific reference is made to the surface roughness of the glass substrate and magnetic thin film although the head can undesirably cling to the magnetic thin film if the film surface is too smooth.

More particularly, if the magnetic head had clung to the magnetic disk, the head could not quickly take off for floating at the start of rotation of the disk. The disk rotates while the head slider remains in contact with the magnetic thin film surface. This results in failure of the magnetic thin film and the head slider. If the magnetic head firmly clings to the magnetic disk, the head slider continues close or immovable contact with the magnetic thin film surface, disabling the disk from starting rotation.

Therefore, clinging is a serious failure by nature and adversely affects CSS durability as will be described later.

The inventors proposed in Japanese Patent Application Kokai No. 43819/1987 a magnetic disk in which a magnetic thin film is formed on a glass substrate having a precision finished surface. More specifically, the glass substrate is precision processed on the surface to a surface roughness Rmax of up to 100Å, preferably up to 50 Å. The glass substrate may be at least partially tempered. No reference is made to the lower limit of the surface roughness Rmax of the glass substrate or to the range of surface roughness Rmax of the medium or magnetic thin film. There are disclosed two examples in which glass substrates have a surface roughness Rmax of 90 Å and 40 Å and magnetic thin films have a surface roughness Rmax of 100 Å and 45 Å. When these disks are used, the spacing of the flying head from the disk can be reduced to about 0.1 to about 0.2 μm.

The inventors found that head clinging can occur when the magnetic thin film has a surface roughness Rmax of 40 Å or less. Head clinging cannot sometimes be prevented if the spacing of the flying head from the disk is reduced to about 0.1 μm or less. Repeating a contact-start-and-stop (CSS) cycle on a disk with the spacing of the flying head from the disk set to 0.2 μm or less, we observed an output drop after a certain number of CSS cycles, indicating that the disk is still insufficient in durability. The CSS durability is particularly low at low temperatures of about 5° to 15° C. or at a flying head-to-disk spacing of 0.1 μm or less.

We have found that the CSS durability of a magnetic disk can be significantly improved when both the surface roughnesses Rmax of a glass substrate and a magnetic thin film thereon are controlled to specific ranges.

SUMMARY OF THE INVENTION

A primary object of the present invention is to provide a novel and improved magnetic recording medium which, when it is operated with a flying magnetic head, ensures high floating stability, minimized head clinging, and excellent CSS durability even at a minimal spacing of the head from the medium.

Another object of the present invention is to provide a method for making the medium.

A further object of the present invention is to provide a magnetic recording/reproducing system including the medium.

According to a first aspect of the present invention, there is provided a magnetic recording medium comprising a glass substrate and a magnetic thin film formed on at least one major surface thereof. The glass substrate on the at least one major surface has a surface roughness Rmax in the range of 10 to 80 Å, preferably 30 to 80 Å. The medium, more precisely the magnetic thin film has a surface roughness Rmax in the range of 50 to 150 Å, preferably 80 to 150 Å. Preferably, the magnetic thin film is predominanrly formed of iron oxide.

The surface roughness Rmax used throughout this disclosure is as defined in Japanese Industrial Standards (JIS) B-0601.

According to a second aspect of the present invention, there is provided a method for making a magnetic recording medium. A magnetic thin film is formed on at least one major surface of a glass substrate having a surface roughness Rmax in the range of 10 to 80 Å. A heat treatment is then carried out such that the surface roughness Rmax of the magnetic thin film may fall in the range of 50 to 150 Å.

According to a third aspect of the present invention, there is provided a system for recording and reproducing information on a magnetic disk, comprising the magnetic disk and a magnetic head wherein the magnetic head floats on the disk during recording and reproducing operation. The magnetic disk comprises a glass substrate and a magnetic thin film formed on at least one major surface thereof wherein the glass substrate on the major surface has a surface roughness Rmax in the range of 10 to 80 Å, and the magnetic thin film has a surface roughness Rmax in the range of 50 to 150 Å. The spacing between the disk and the flying head in operation is up to 0.2 μm.

Since both the surface roughnesses Rmax of a glass substrate and a magnetic thin film thereon are controlled to the specific ranges, the magnetic recording medium according to the present invention has many advantages. The CSS durability of the medium is significantly improved, particularly at low temperatures, while floating stability and anti-clinging are achieved during operation at a minimal spacing of the flying head from the medium.

The surface roughness Rmax ranges of glass substrate and magnetic thin film as defined in the present invention are not disclosed in the above-cited patents and the literature.

U.S. Pat. No. 4,608,293 discloses that an insulating film of $Al_2O_3$ having a surface roughness of up to 50 Å is formed on a ceramic substrate and a magnetic thin film is formed thereon. However, it refers nowhere the surface roughness of the magnetic thin film and the clinging and CSS durability associated therewith. As compared with this patent, the present invention has a benefit of eliminating the need for an undercoat layer.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
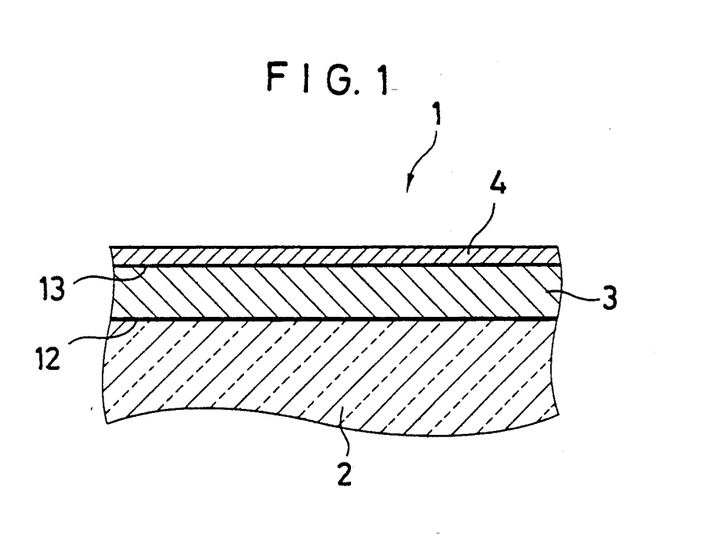
FIG. 1 is a cross section of a portion of a magnetic recording medium according to the present invention.

Referring to FIG. 1, there is illustrated at 1 a magnetic recording medium according to the present invention as comprising a substrate 2 and a magnetic thin film 3 in the form of a continuous thin film. In general, the substrate is in the form of a disk and has a pair of opposed major surfaces, one of which is designated at 12. The magnetic thin film 3 has a pair of opposed major surfaces, one surface in close contact with the substrate surface 12 and another surface remote from the substrate. The other or upper surface of the magnetic thin film 3 is designated at 13. It is this upper surface 13 that is referred to as the surface of the magnetic thin film in this disclosure.

The substrate used herein is formed of glass for the reasons that its preparation is simplified partly because the need for an undercoat layer is eliminated and that it can be readily polished to a controlled surface roughness.

Aluminum alloy substrates having a plated Ni-P layer or an anodized film impose certain limits on the heating temperature as previously described. In contrast, glass substrates withstand heating temperatures of up to 400° C. They are advantageous particularly when heating is necessary as in forming a magnetic thin film of iron oxide. The magnetic recording medium of the invention is preferably prepared by a method including heating for the purpose of controlling the surface roughness of the magnetic thin film as will be described later. Thus the glass substrates capable of withstanding elevated temperatures have another advantage of expediting the surface roughness control.

The glass used herein may preferably be tempered glass. More preferred are glasses surface tempered by chemical strengthening. In general, glass is chemically tempered by replacing alkali ions in proximity of the glass surface by alkali ions of another species from the exterior at a temperature lower than the transition temperature whereby compression stresses are induced at the glass surface by the difference in the spatial volume occupied by the ions. Ion substitution is carried out by dipping the glass in a molten alkali salt. The salt used herein may be a nitrate, sulfate or similar salt. The molten salt is at a temperature of about 350° to about 650° C. and the dipping time ranges from about 1 to about 24 hours.

More illustratively, soda glass may be strengthened by using $KNO_3$ as the molten alkali salt to thereby substitute K ions for Na ions in the glass. Lithium-containing glass may be strengthened by dipping in $NaNO_3$ to substitute Na ions for Li ions in the glass. It is also possible to simultaneously replace Na and Li ions in glass.

Since the thus strengthened or compression stressed layer is present only in proximity to the glass substrate surface, there results a surface tempered glass. The strengthened or compression stressed layer is preferably 10 to 200 $\mu m$, more preferably 50 to 150 $\mu m$ thick.

Such surface tempered glasses are described in U.S. Pat. No. 3,287,200 and Japanese Patent Application Kokai Nos. 43819/1987 and 175219/1988.

That portion of a glass substrate which is strengthened may be, in the case of a magnetic disk, the inner circumferential edge, an inner circumferential edge portion, the outer circumferential edge, an outer circumferential edge portion or any combination thereof or the entire annular surface.

The glass substrate on one major surface has a surface roughness Rmax in the range of 10 to 80 Å. Outside this range, the CSS durability at a reduced floating distance of an associated medium, particularly at low temperatures critically lowers even when the surface roughness Rmax of the magnetic thin film is controlled to the range of 50 to 150 Å. Better results are obtained when the surface roughness Rmax of the glass substrate is in the range of 30 to 80 Å, more preferably 40 to 80 Å, most preferably 40 to 60 Å.

The surface roughness of the glass substrate may be controlled to the above-specified range, for example, by mechanochemical polishing under properly selected conditions as disclosed in Japanese Patent Application Kokai Nos. 43819/1987 and 175219/1988. After polishing, the substrate is washed.

The material of the glass substrate is not critical to the present invention. A choice may be made from borosilicate glass, aluminosilicate glass, quartz glass, and titanosilicate glass and the like. Aluminosilicate glass is preferred for mechanical strength.

Crystal-free glass is preferably used when the glass substrate is surface smoothed by mechanochemical polishing as disclosed in Japanese Patent Application Kokai No. 43819/1987. Otherwise the desired Rmax range is not achievable since grain boundaries are polished relatively faster by mechanochemical polishing.

The shape and dimensions of the glass substrate are not particularly limited although it is generally of a disk shape having a thickness of about 0.5 mm to about 5 mm and a diameter of about 25 mm to about 300 mm.

On the glass substrate 2 is formed a magnetic thin film 3 in the form of a continuous thin film as shown in FIG. 1.

The magnetic thin film is not particularly limited. Better results are obtained when the present invention is applied to magnetic recording media having magnetic thin films predominantly comprising iron oxide $\gamma$-$Fe_2O_3$. This preferred example is described in detail.

Magnetic thin films predominantly comprising $\gamma$-$Fe_2O_3$ are preferably prepared by first forming $Fe_3O_4$ and then oxidizing it into $\gamma$-$Fe_2O_3$. Formation of $Fe_3O_4$ may be either by a direct process or by an indirect process although the direct process is preferred because of simplicity.

The direct process is to directly form $Fe_3O_4$ on a substrate by a reactive sputtering technique. The direct process may be classified into three types, an oxidative sputtering in an oxidizing atmosphere using a target of Fe, a reductive sputtering in a reducing atmosphere using a target of $\alpha$-$Fe_2O_3$, and a neutral sputtering in a neutral atmosphere using a target of $Fe_3O_4$. The oxidative sputtering is preferred for the present invention because of ease of sputtering control and a high rate of film formation.

The indirect process is by sputtering an Fe target in an oxidizing atmosphere to form $\alpha$-$Fe_2O_3$ and reducing it into $Fe_3O_4$. Forming a magnetic thin film by the indirect process is also contemplated in the present invention.

Once $Fe_3O_4$ has been formed by sputtering either directly or indirectly, the next step is to oxidize it to the gamma form, $\gamma$-$Fe_2O_3$. Oxidation is preferably carried by a heat treatment in the ambient air. The heat treatment may be at a temperature of about 200° to 400° C. for about 10 minutes to about 10 hours.

The magnetic thin film may contain an additional element such as Co, Ti, and Cu in addition to the gamma iron oxide if desired. It will be understood that argon or other elements in the film forming atmosphere can be entrained in the magnetic thin film.

The detail of the above-mentioned process is described in Densi Tusin Gakkai Ronbun Shi (the Journal of Japanese Electronic Communications Association), 9/'80, Vol. J63-C, No. 9, pages 609-616. It is recommended to form a magnetic layer in accordance with the teaching of this article.

Other examples of the magnetic thin film which can be used herein include films of various alloys such as Co-Ni, Co-Ni-Cr, Co-Cr, Co-Ni-P, Co-Zn-P, and Co-Ni-Mn-Re-P, which may be formed by vapor deposition or plating. It is to be noted that these films are less desirable than the above-mentioned iron oxide films in view of corrosion resistance and durability. In the case of Co-Ni and similar alloys, an intermediate layer of chromium or the like preferably intervenes between the substrate and the magnetic thin film.

As described above, the magnetic thin film may be formed by any desired methods including vapor phase deposition techniques, evaporation, plating of a thin film predominantly comprising iron oxide, and thin film formation plus subsequent heat treatment.

The magnetic thin film is preferably about 500 to about 3,000 Å thick for productivity and magnetic properties.

The magnetic thin film 3 on the upper surface 13 remote from the substrate 2 (see FIG. 1) has a surface roughness 10 Rmax of 50 to 150 Å. Within this range of surface roughness Rmax, clinging of the flying magnetic head to the magnetic recording medium does not occur. Stable recording/reproducing operation is always ensured even when the distance of the air bearing surface of the flying magnetic head from the medium surface is as small as 0.1 $\mu$m or less. Efficient high density recording is possible. CSS durability is improved particularly at low temperatures.

Even with the surface roughness Rmax of glass substrate in the range of 10 to 80 Å, if the surface roughness Rmax of magnetic thin film is below 50 Å or beyond 150 Å, the medium shows reduced CSS durability at minimal floating distances and low temperatures.

Insofar as the Rmax of the substrate Rmaxs is 10 to 80 Å and the Rmax of the magnetic thin film Rmaxm is 50 to 150 25 Å, the Rmax of the magnetic thin film is generally larger than the Rmax of the substrate. Better results are obtained when the surface roughness Rmax of the magnetic thin film is in the range of 80 to 150 Å, more preferably 80 to 120 Å, most preferably 90 to 120 Å, and Rmaxm/Rmaxs is in the range of preferably 1.05 to 15, more preferably 1.1 to 5.

In order that the magnetic thin film have a surface roughness Rmax in the specific range, the film forming process may be properly modified In the case of a magnetic thin film predominantly comprising iron oxide, for example, the Rmax may be controlled by selecting the temperature and time of the heat treatment in air for oxidizing $Fe_3O_4$ into $\gamma$-$Fe_2O_3$. In the case of a metal magnetic thin film, the film as deposited is heat treated in an inert atmosphere at a temperature of about 100 to 500° C. for about 10 minutes to about 10 hours such that the film may reach the desired Rmax.

In a preferred embodiment, a lubricating film 4 is formed on the magnetic thin film 3 as shown in FIG. 1. The lubricating film preferably contains an organic compound, especially an organic compound having a polar group or a hydrophilic group or moiety. The organic compounds used as the lubricating film are not critical to the present invention. They may be either liquid or solid and include organofluoro compounds, for example, perfluoropolyethers as described in EP Publication Nos. 0165649 and 0165650, well-known various fatty acids, esters, and alcohols.

The method of forming the lubricating film is not critical. Any desired application methods, typically coating may be used.

The lubricating film on the surface preferably has a contact angle with water of at least 70°, more preferably at least 90°. The lubricating film having such a contact angle is effective in preventing the magnetic head from clinging to the medium.

The thickness of the lubricating film is usually in the range of about 4 to about 300 Å although it varies with a particular film forming method and a particular compound. Lubricating films of thinner than 4 Å are ineffective for lubrication and durability. Lubricating films uof up to 300 Å thick are effective in minimizing clinging and magnetic head crash. The preferred thickness is in the range of 4 to 100 Å, especially 4 to 80 Å.

A lubricating film within the thickness range defined above substantially reproduces the surface roughness Rmas of the magnetic thin film on the lubricating surface. Broadly stated, the magnetic recording medium of the present invention has a surface roughness Rmas of 50 to 150 Å on the surface.

In the present invention, the measurement of surface roughness Rmas is made on he final film covered with a lubricating film and an optical protective film. The measured roughness on the surface of the disk substantially corresponds to that on the surface of the magnetic thin film, or on the surface of the optional protective film on the magnetic thin film, because the overlying lubricating layer is very thin and most often liquid, and thus negligible for roughness measurement.

The magnetic recording medium of the present invention may perform effective recording/reproducing operation in combination with any well-known magnetic heads including flying magnetic heads of the composite and monolithic types. Better results are obtained when the medium is operated with flying magnetic heads of the thin film type.

Figure 2:
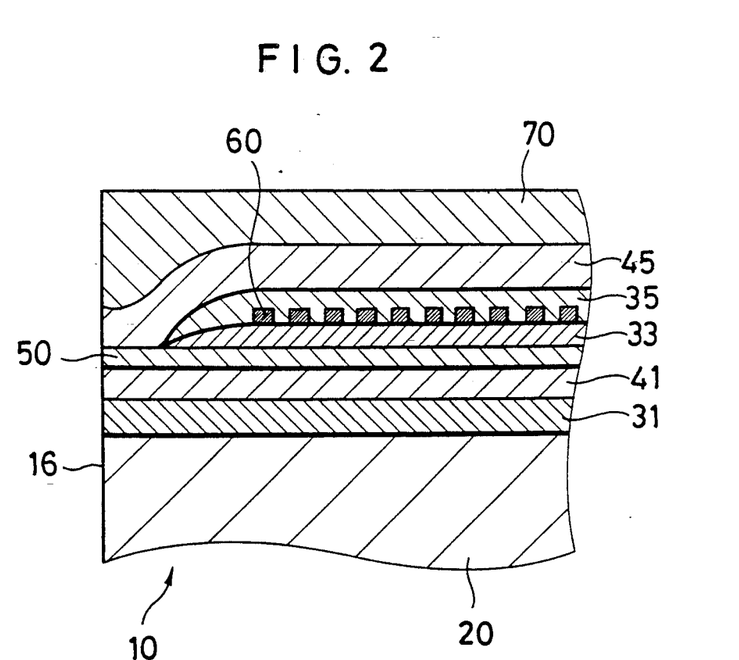
FIG. 2 is a cross section of a portion of a magnetic head used in the system of the present invention.

FIG. 2 is a cross section of a portion of a thin film type flying magnetic head according to a preferred embodiment of the present invention. The flying magentic head generally designated at 10 includes a base 20, a first insluating layer 31, a lower pole layer 41, a gap layer 50, a second insulating layer 33, a coil layer 60, a third insluating layer 35, and an upper pole layer 45, and a protective layer 70 stacked in this order. The base 20 and the layers define a front or floating surface 16 at one end. A lubricating film may be applied to the front surface 16 of the head 10 if desired. Such a lubricating film may be the same as previously described for the magnetic recording medium.

The head on the front surface, i.e., the air bearing surface has a surface roughness Rmas in the range of up to 200 Å, preferably 50 to 150 Å. Better performance is expectable when a magnetic recording medium having a specific surface roughness Rmax is operated with a head having a specific surface roughness Rmax.

The coil layer 60 may be formed from any desired material, generally from a metal such as aluminum and copper. No particular limits are imposed on the pattern and density of the coil. The coil may be wound in a well-known conventional manner. For exmaple, the coil pattern may be of the spiral type illustrated in FIG. 2, laminate type or zigzag type. The coil layer 60 may be formed by any desired vapor phase deposition techniques including sputtering or wet plating techniques.

The base 20 may be formed from any well-known materials including Mn-Zn ferrite. The base is preferably formed from ceramic materials having a Vickers hardness of at least about 1,000, more preferably about 1,000 to about 3,000, particularly when the magnetic head is used in combination with a magnetic recording medium having a continuous thin film type magnetic layer predominantly comprising iron oxide.

Examples of ceramic materials having a Vickers hardness of at least about 1,000 include $Al_2O_3$-TiC base ceramic materials, $ZrO_2$ base ceramic materials, SiC base ceramic materials, and AlN base ceramic materials. They may contain an additional component(s) such as Mg, Y, $ZrO_2$, and $TiO_2$. Preferred among them are $Al_2O_3$-TiC base ceramic materials, SiC base ceramic materials, and AlN base ceramic materials. The $Al_2O_3$-TiC base ceramic materials are most preferred for their hardness relative to the hardness of magnetic thin films of iron oxide.

The lower and upper pole layers 41 and 45 may be formed from any well-known materials including Permalloy, Sendust, and amorphous magnetic cobalt base alloys. The magnetic poles are usually provided separately as shown by the lower and upper pole layers 41 and 45 in FIG. 2.

The gap layer or spacer 50 intervenes between the lower and upper pole layers 41 and 45. The gap layer 50 may be formed from any well-known materials including $Al_2O_3$ and $SiO_2$.

The magnetic pole layers 41, 45 and the gap layer 50 may be of conventional well-known design with respect to their pattern, thickness and the like.

In the illustrated embodiment, the coil layer 60 is spirally disposed between the lower and upper pole layers 41 and 45 while the insulating layers 33 and 35 intervene between the coil layer 60 and the lower and upper pole layers 41 and 45. The insulating layer 31 is disposed between the base 20 and the lower pole layer 41. These insluating layers may be formed from any well-known materials. For example $SiO_2$, glass, and $Al_2O_3$ may be used when it is desired to form an insulating thin film by sputtering.

The protective layer 70 is present on the top of the head, more specifically on the upper pole layer 45. The protective layer 70 may be formed from any well-known materials, for example, $Al_2O_3$. An additional resinous coating may be applied to the protective layer.

Briefly stated, the process for producing such a thin film type flying magnetic head includes thin film formation and patterning. To form thin films which constitute the respective layers as described above, any well-known vapor phase deposition on wet plating techniques may be used, for example, vacuum deposition, sputtering, and plating. Patterning of the respective layers of the head may be carried out by selective etching or selective deposition, which are both well known in the art. The etching may be either wet or dry etching.

The flying magnetic head as far described is usually combined with well-known members such as an arm to form a head assembly.

Recording and reproducing operation on the magnetic recording medium of the present invention, particularly in the form of a magnetic disk, may be carried out by rotating the disk while keeping the head afloat. The disk is usually rotated at about 2,000 to about 6,000 revolutions per minute (r.p.m.), especially about 2,000 to about 4,000 r.p.m. The distance or spacing of the flying head away from the disk surface is usually set to at most 0.2 μm, preferably at most 0.15 μm, more preferably at most 0. μm. A typical spacing in the range of from 0.01 to 0.09 μm is effective for floating performance and CSS durability. The floating distance may be adjusted by changing the slider width and head load.

EXAMPLE

Examples of the present invention are given below by way of illustration and not by way of limitation.

EXAMPLE 1

Magnetic Disk having Magnetic Thin Film of $\gamma$-$Fe_2O_3$

An annular substrate of aluminosilicate glass having an outer diameter of 130 mm, an inner diameter of 40 mm and a thickness of 1.9 mm was polished on one major surface. It was then chemically strengthened by dipping in molten potassium nitrate at 45-0° C. for 10 hours. The glass substrate was further smoothed on the surface by mechanochemical polishing with abrasive liquid containing colloidal silica. At the end of polishing, the glass substrate had a surface roughness Rmax of 50 Å. It was then washed.

A magnetic thin film was then formed on the surface of the smoothed glass substrate. Reactive sputtering was carried out in an atmosphere of Ar and $O_2$ in a volume ratio of 90:10 at $10^{-3}$ Torr using a target of Fe, depositing magnetite $Fe_2O_4$ as thin film of 2,000 Å thick. The film was then oxidized in air at 310° C. for one hour, converting into a magnetic thin film of $\gamma$-$Fe_2O_3$.

A lubricating film was formed on the magnetic thin film. A solution containing 0.1% by weight of the compound of the formula:

having a molecular weight of 2,000 was applied to the magnetic thin film by spin coating to a thickness of 20 Å. The lubricating film had a contact angle with water of 100° as measured after 30 seconds from dropwise application of water.

The resulting disk, which is designated disk sample No. 1, had a surface roughness Rmax of 100 Å on the surface.

A series of disks were prepared by the same procedure as above except that the surface roughness Rmax of the glass substrate and the disk on the magnetic thin film side surface were changed as shown in Tables 1, 2 and 3. The surface roughness Rmax of the magnetic thin film was controlled by changing the temperature and time of heat treatment on the film in air as reported in Tables 1, 2, and 3.

These disks were determined for CSS durability, clinging, and floating stability using a magnetic head as defined below. The results are shown in Tables 1, 2, and 3.

Magnetic Head

Flying magnetic heads of the air bearing type were prepared by successively forming necessary tin film elements on a $Al_2O_3$-TiC base having a Vickers hardness of 2200, processing to the desired head configuration, and mounting the head to a springy support known as a gimbal. The heads had a surface roughness Rmax of 130 Å on the floating surface.

The heads were designed to provide a flying height of 0.05 μm, 0.1 μm, and 0.22 μm by adjusting the slider width and gimbal load.

The test methods for CSS durability, clinging, and floating stability are described below.

CSS Test

Figure 3:
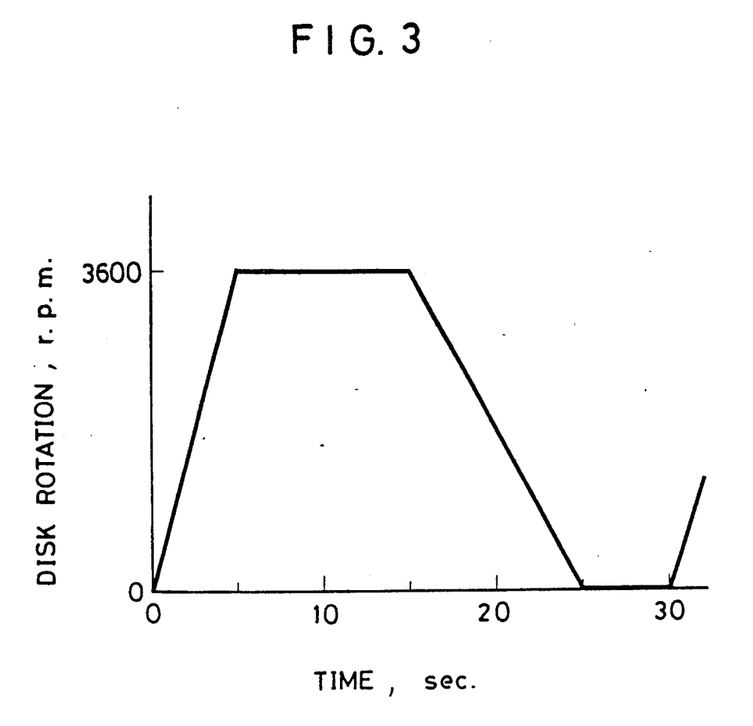
FIG. 3 is a diagram showing the profile of one cycle of a CSS test in which the revolution of a disk is plotted relative to time.

A contact-start-and-stop (CSS) test was carried out on the disk using the aforementioned heads under two sets of conditions, 25° C. and RH 50% and 5° C. and RH 50%. One cycle of the CSS test is shown in the diagram of FIG. 3 as comprising starting rotation of the disk to 3,600 r.p.m., maintaining rotation for a while, and then stopping the disk in an overall period of 25 seconds. The CSS cycle was repeated until the recording/reproducing output was reduced to below one half of the initial. The CSS durability was evaluated in terms of the following five ratings.

⊙: 100,000 cycles or more
○: 50,000–100,000 cycles
Δ: 20,000–50,000 cycles
X: 10,000–20,000 cycles
XX: less than 10,000 cycles

Clinging

The magnetic head was allowed to rest on the disk surface at 30° C. and RH 70% for some time. The drive was actuated to start rotation of the disk. Clinging was evaluated at the time of starting. The ratings for evaluation were shown below.

O: no cling
Δ: Disk could start rotation with the aid of a starting torque.
X: Disk could not start rotation.

Floating Stability

The disk was rotated while the head was kept afloat thereon. An acoustic emission (AE) sensor detected clicks produced by the head striking the disk (magnetic thin film). The floating stability was evaluated in terms of the following ratings.

O: stable floating, no AE detection
Δ: AE produced some outputs.
X: AE produced over-scale outputs.

TABLE 1

| Sample No. | Glass substrate $R_{max}$ (Å) | Magnetic thin film heat treatment Temp. (°C.) | Time (hr) | Disk surface $R_{max}$ (Å) | Head floating distance 0.1 μm CSS cycles 25° C. | 5° C. | Clinging | Floating stability |
|---|---|---|---|---|---|---|---|---|
| 1 | 50 | 310 | 1 | 100 | ⊙ | ⊙ | ○ | ○ |
| 2 | 45 | 310 | 1.5 | 100 | ⊙ | ⊙ | ○ | ○ |
| 3 | 30 | 310 | 3 | 100 | ⊙ | ○ | ○ | ○ |
| 4* | 5 | 310 | 5.5 | 100 | X | X X | ○ | ○ |
| 5 | 55 | 300 | 2 | 100 | ⊙ | ⊙ | ○ | ○ |
| 6 | 70 | 290 | 1 | 100 | ⊙ | ⊙ | ○ | ○ |
| 7* | 90 | 270 | 2 | 100 | ○ | Δ | ○ | ○ |
| 8* | 40 | 270 | 1 | 45 | X | X | X | ○ |
| 9 | 45 | 300 | 2 | 90 | ⊙ | ⊙ | ○ | ○ |
| 10 | 50 | 310 | 2 | 110 | ⊙ | ⊙ | ○ | ○ |
| 11 | 50 | 315 | 2.5 | 140 | ⊙ | ⊙ | ○ | ○ |
| 12* | 50 | 315 | 5 | 180 | X | X | ○ | X |
| 13* | 5 | 280 | 1 | 30 | X | X X | X | ○ |
| 14* | 100 | 310 | 4 | 180 | X | X | ○ | X |

*Comparison

TABLE 2

| Sample No. | Glass substrate $R_{max}$ (Å) | Magnetic thin film heat treatment Temp. (°C.) | Time (hr) | Disk surface $R_{max}$ (Å) | Head floating distance 0.05 μm CSS cycles 25° C. | 5° C. | Clinging | Floating stability |
|---|---|---|---|---|---|---|---|---|
| 1 | 50 | 310 | 1 | 100 | ⊙ | ⊙ | ○ | ○ |
| 2 | 45 | 310 | 1.5 | 100 | ⊙ | ⊙ | ○ | ○ |
| 3 | 30 | 310 | 3 | 100 | ○ | Δ | ○ | ○ |
| 4* | 5 | 310 | 5.5 | 100 | X X | X X | ○ | ○ |
| 5 | 55 | 300 | 2 | 100 | ⊙ | ⊙ | ○ | ○ |
| 6 | 70 | 290 | 1 | 100 | ⊙ | ○ | ○ | ○ |
| 7* | 90 | 270 | 2 | 100 | Δ | X | ○ | ○ |
| 8* | 40 | 270 | 1 | 45 | X | X X | X | ○ |
| 9 | 45 | 300 | 2 | 90 | ⊙ | ⊙ | ○ | ○ |
| 10 | 50 | 310 | 2 | 110 | ⊙ | ⊙ | ○ | ○ |
| 11 | 50 | 315 | 2.5 | 140 | ⊙ | ○ | ○ | ○ |
| 12* | 50 | 315 | 5 | 180 | X X | X X | ○ | X |
| 13* | 5 | 280 | 1 | 30 | X X | X X | X | ○ |
| 14* | 100 | 310 | 4 | 180 | X X | X X | ○ | X |

*Comparison

TABLE 3

| Sample No. | Glass substrate $R_{max}$ (Å) | Magnetic thin film heat treatment Temp. (°C.) | Time (hr) | Disk surface $R_{max}$ (Å) | Head floating distance 0.22 μm CSS cycles 25° C. | 5° C. | Clinging | Floating stability |
|---|---|---|---|---|---|---|---|---|
| 1 | 50 | 310 | 1 | 100 | ⊙ | ⊙ | ○ | ○ |
| 2 | 45 | 310 | 1.5 | 100 | ⊙ | ⊙ | ○ | ○ |
| 3 | 30 | 310 | 3 | 100 | ⊙ | ⊙ | ○ | ○ |
| 4* | 5 | 310 | 5.5 | 100 | X | X | ○ | ○ |
| 5 | 55 | 300 | 2 | 100 | ⊙ | ⊙ | ○ | ○ |
| 6 | 70 | 290 | 1 | 100 | ⊙ | ⊙ | ○ | ○ |

TABLE 3-continued

| Sample No. | Glass substrate $R_{max}$ (Å) | Magnetic thin film heat treatment Temp. (°C.) | Time (hr) | Disk surface $R_{max}$ (Å) | Head floating distance 0.22 μm CSS cycles 25° C. | 5° C. | Clinging | Floating stability |
|---|---|---|---|---|---|---|---|---|
| 7* | 90 | 270 | 2 | 100 | ⊙ | ⊙ | ○ | ○ |
| 8* | 40 | 270 | 1 | 45 | ×× | ×× | × | ○ |
| 9 | 45 | 300 | 2 | 90 | ⊙ | ⊙ | ○ | ○ |
| 10 | 50 | 310 | 2 | 110 | ⊙ | ⊙ | ○ | ○ |
| 11 | 50 | 315 | 2.5 | 140 | ⊙ | ⊙ | ○ | ○ |
| 12* | 50 | 315 | 5 | 180 | ○ | △ | ○ | ○ |
| 13* | 5 | 280 | 1 | 30 | ×× | ×× | × | ○ |
| 14* | 100 | 310 | 4 | 180 | ○ | △ | ○ | ○ |

*Comparison

Table 1 for the floating distance of 0.1 μm shows that the disk is free of clining to the head, establishes stable floating operation to the head, and has improved CSS durability both at room and low temperatures when the glass substrate and the disk have a surface roughness Rmax within the ranges of the invention. In contrast, the CSS durability at a low temperature is aggravated when one or both of the surface roughnesses Rmax of the glass substrate and the disk are outside the ranges of the invention.

This tendency becomes more outstanding in Table 2 for the floating distance of 0.05 μm. The CSS durability both at room and low temperatures is reduced by 5-% or more, in extreme examples, to one order of CSS cycles even when one of the surface roughnesses Rmax of the glass substrate and the disk is outside the range of the invention.

Table 3 for the floating distance of 0.22 μm shows that the surface roughness Rmax is not so influential at such a large floating distance.

For disk sample No. 1, the recording density D50 at which the reproducing output was reduced to one half was measured at each of the floating distances. D50 is expressed in kilo flux change per inch (KFCI).

TABLE 4

| Floating distance | D50 (KFCI) |
|---|---|
| 0.22 μm | 25 |
| 0.10 μm | 37 |
| 0.05 μm | 53 |

As seen from Table 4, the recording density can be substantially increased when the floating distance is up to 0.2 μm, especially up to 0.1 μm. The present invention achieves many benefits as described above for such high density recording.

EXAMPLE 2

Magnetic Disk having Magnetic Layer of Co-Ni Alloy

A magnetic disk sample was prepared by successively forming an intermediate layer, a magnetic layer, a protective layer, and a lubricating layer on a glass substrate which was the same as used in Example 1.

The intermediate layer was a thin film of chromium, which was formed by sputtering a target of Cr in an argon atmosphere to a thickness of 3,000 Å. The amgnetic layer was a thin film of Co-Ni alloy which was formed by sputtering a target of Co-20% Ni alloy to a thickness of 500 A. The protective layer was a thin film of carbon which was formed by sputtering to a thickness of 150 Å. The lubricating layer was the same as in Example 1.

After the protective film was formed, heat treatment was carried out at 200° to 400° C. for 1 to 5 hours, obtaining disks having varying surface roughness Rmax.

These disk samples were examined by thes ame tests as in Example 1. The results were substantially equivalent to those of Example 1.

Although some preferred embodiments have been described, many modifications and variations may be made thereto in the light of the above teachings. It is therefore to be understood that within the scope of the appended claims, the invention may be practiced otherwise than as specifically described.

We claim:

1. A system for recording and reproducing information on a magnetic disk, comprising the magnetic disk and a magnetic head wherein the magnetic head floats on the disk during recording and reproducing operation, characterized in that said magnetic disk comprises a glass substrate and a magnetic thin film formed on at least one major surface thereof, the glass substrate on the major surface has a surface roughness Rmax in the range of 10 to 80 Å, the medium on the surface has a surface roughness Rmax in the range of 50 to 150 Å, and the sapcing between the disk and the flying head in operation is up to 0.2 μm;

wherein the magnetic head on he air bearing surface has a surface roughness Rmax of up to 200 Å.

2. The system of claim 1 wherein the glass substrate has a surface roughness Rmax in the range of 30 to 80 Å and the medium has a surface roughness Rmax in the range of 80 to 150 Å.

3. The system of claim 1 wherein said glass substrate is at least a surface tempered glass.

4. The system of claim 1 wherein said magnetic thin film predominantly comprises iron oxide.

5. The system of claim 1 wherein said spacing is up to 0.1 μm.

6. The system of claim 1 wherein said magnetic head comprises a base and spaced magnetic poles of thin film structure on the base, said base and said poles defining an air bearing surface at one end adapted to face the magnetic disk.

7. The system of claim 1 wherein said magnetic head base has a Vickers hardness of at least 1000.

8. The system of claim 1 wherein the magnetic recording medium is produced by a process comprising the steps of:

providing a glass substrate having on at least one major surface thereof a surface roughness Rmax in the range of 10 to 80 Å, forming a magnetic thin film on the at least one major surface of said glass substrate to provide a film-bearing substrate, and heating the film-bearing substrate at a temperature of 200 to 500 degrees C. for surface roughness adjustment to provide a surface roughness Rmax of the recording medium in the range of 50 to 150 Å.

* * * * *

UNITED STATES PATENT AND TRADEMARK OFFICE
CERTIFICATE OF CORRECTION

PATENT NO. : 5,080,948
DATED : January 14, 1992
INVENTOR(S) : Morita et al.

It is certified that error appears in the above-identified patent and that said Letters Patent is hereby corrected as shown below:

Column 14, line 35, "sapcing" should read:

--spacing--;

line 37, "he" should read:

--the--.

Signed and Sealed this

First Day of June, 1993

Attest:

MICHAEL K. KIRK

*Attesting Officer*     Acting Commissioner of Patents and Trademarks